March 11, 1958  C. D. BAILEY  2,826,390
ELECTROMAGNETIC HYDRAULIC BRAKE LOCK
Filed March 19, 1954  3 Sheets-Sheet 1

INVENTOR
CURTIS D. BAILEY
BY
John B. Brady
ATTORNEY

March 11, 1958 C. D. BAILEY 2,826,390
ELECTROMAGNETIC HYDRAULIC BRAKE LOCK
Filed March 19, 1954 3 Sheets-Sheet 2
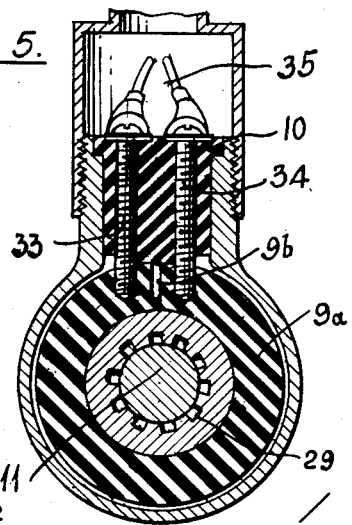
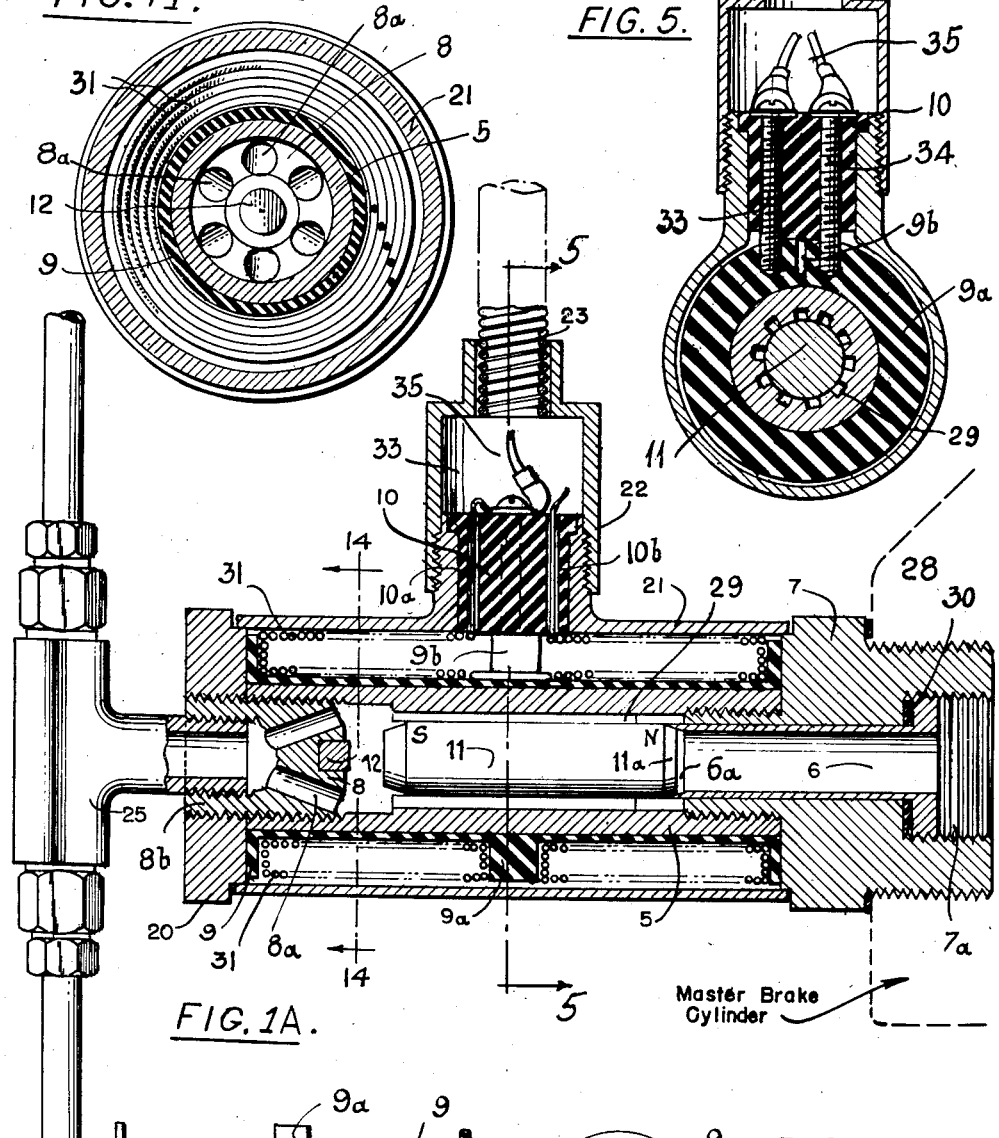
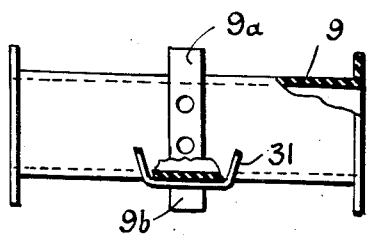
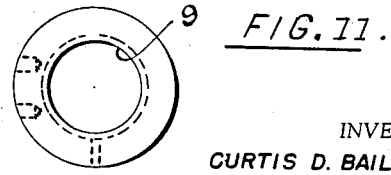
INVENTOR
CURTIS D. BAILEY
BY
John B. Brady
ATTORNEY March 11, 1958

C. D. BAILEY 2,826,390

ELECTROMAGNETIC HYDRAULIC BRAKE LOCK

Filed March 19, 1954

INVENTOR.
CURTIS D. BAILEY

BY

John B. Brady
ATTORNEY.

United States Patent Office 2,826,390
Patented Mar. 11, 1958

2,826,390

ELECTROMAGNETIC HYDRAULIC BRAKE LOCK

Curtis D. Bailey, North Kenova, Ohio

Application March 19, 1954, Serial No. 417,437

8 Claims. (Cl. 251—139)

My invention relates broadly to brake locks and more particularly to an electromagnetic lock system for hydraulic brakes on motor vehicles.

One of the objects of my invention is to provide an electromagnetically controlled hydraulic brake lock for vehicles whereby the hydraulic brakes are rendered effective while the vehicle is in parked condition.

Another object of my invention is to provide a simplified construction of electromagnetically controlled brake lock system whereby an electromagnetic device interposed in the fluid pressure line between the master brake cylinder and the brake drums may be controlled from a remote position on the dash of the vehicle through a single pair of conductors.

Another object of my invention is to provide a simplified construction of locking switch for reversing circuit connections to an electromagnetic control device for operating the fluid valve between the master brake cylinder and the brake drums of a hydraulic brake system for vehicles.

Still another object of my invention is to provide a construction of electromagnetic operating mechanism for fluid valves in which open and closed conditions of the fluid valve may be effected by simply a reversal of the magnetic field in the electromagnetic operating mechanism from a remote control position.

Still another object of my invention is to provide a construction of electromagnetically operated fluid valve in which the position of a tubular armature is controlled by a reversal in direction of a concentrically located magnetic field associated with the device.

Other and further objects of my invention reside in the construction of the electromagnetic valve control system and in the associated switch lock as set forth more fully in the specification hereinafter following by reference to the accompanying drawings, in which:

Fig. 1A is a vertical cross sectional view through the electromagnetically controlled valve of my invention;

Fig. 5 is a vertical sectional view taken substantially on line 5—5 of Fig. 1A;

Figure 12:
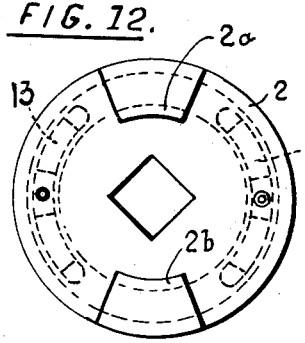
Figure 13:
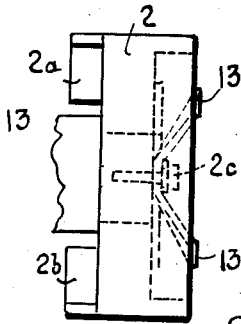
Figure 4:
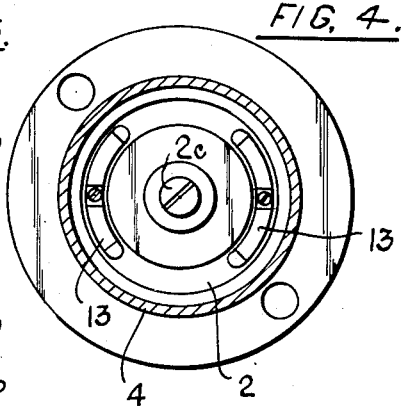
Fig. 4 is a vertical sectional view taken substantially on line 4—4 of Fig. 1.
Figure 8:
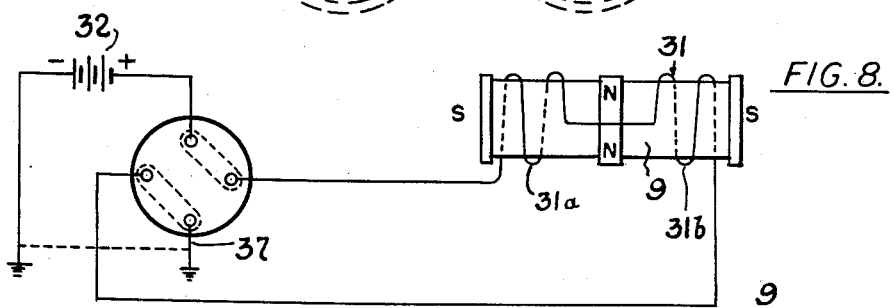
Figure 9:
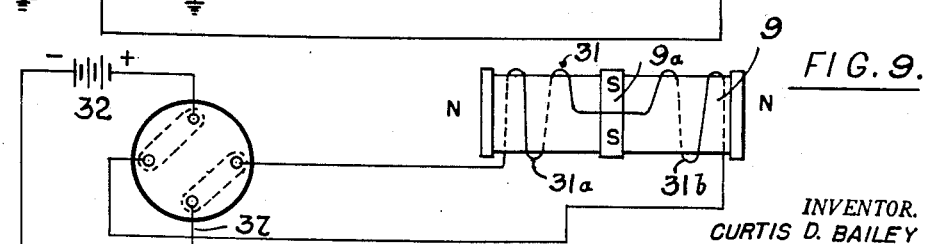

Fig. 8 schematically illustrates the polarity of the electromagnetic control system upon movement of the control switch to one limiting position;

Fig. 9 is a view similar to the view shown in Fig. 8 but illustrating the polarity of the magnetic flux in the electromagnetic system upon movement of the control switch to the opposite limiting position;

Fig. 10 is an elevational view of the support for the electromagnetic winding employed in controlling the valve of my invention;

Fig. 11 is an end view of the winding support shown in Fig. 10;

Fig. 12 is a front elevational view of the block of insulation material employed in the switch structure of my invention;

Fig. 13 is a side elevational view of the block shown in Fig. 12; and

Fig. 14 is a transverse sectional view taken on line 14—14 of Fig. 1A.

My invention is directed to an electromagnetic control system applicable to the hydraulic lines of an automobile leading from the master cylinder to the brake cylinders, and preferably mounted on the master cylinder in such a way that the entire fluid flow required for energizing the brakes will flow through the body of the control device.

Practically all present day automobiles have hydraulic brakes for all ordinary braking of the car, and a so-called emergency brake which is usually a friction band about a drum mounted at the end of the drive shaft and connected by linkage to a hand lever within reach of the driver.

The hydraulic brakes are generally energized by pressure of a foot pedal against a piston in the master cylinder which transmits power to the wheel cylinders. Upon removal of pressure on the pedal, pressure in the hydraulic lines reduces to zero, and all retarding effect of the brakes on the vehicle also reduces to zero.

In changing a tire on the highway, one corner of the vehicle must be raised by a jack to effect removal of the tire. Due to carelessness of the part of many vehicle operators, in leaving the emergency brake partly on at times, this brake becomes ineffective in holding the car steady while being jacked up. This evolves a dangerous situation, for which the vehicle high off the ground, and with little restraint to moving, the car may swerve from the jack and fall to the ground, with a possibility of injuring the operator. Many operators feel that as the emergency brake only affects the rear wheels at best, it is safer to block all wheels to prevent vehicle movement; and this requires that blocking be carried in the vehicle; as it is unlikely that blocking can be found at the place where the tire has to be changed.

In a situation as here described, hydraulic brakes are useless; since there is no convenient way to hold them locked.

In cities where the terrain is hilly, many times vehicles have to be parked on steep grades and held by mechanical brakes which are not very dependable because of conditions already mentioned. The hydraulic brakes would offer the best solution to this braking problem if they could be applied and locked.

It must also be admitted the safety of the vehicle against theft is not, at the present time, all that could be desired. Professional car thieves find no great difficulty in opening windows or in wiring around the ignition switch and driving the vehicle away, or in towing it away if they fail to start it. However, if all four hydraulic brakes are locked firmly, and the means for so doing this mechanically protected, it is extremely difficult to either drive or tow the car away. My invention meets and solves this problem in a most effective way for foiling car thieves.

My invention provides an assembly of the electromagnetic check valve of a cylindrical form, arranged in the hydraulic pressure control line to the hydraulic brakes of the vehicle and operated from the dashboard position of the vehicle through a manually lockable switch. By manipulating the switch the operator is able to control the electromagnetic check valve and place fluid pressure on the brake cylinders for locking the wheels so that even with part of the vehicle elevated on a jack the wheels of the vehicle will not roll and accidental displacement of the vehicle is avoided.

Referring to the drawings in detail the lock switch is shown at 1 mounted on the dashboard of a vehicle. The lock switch includes a contact block 2 disposed within the lock cover electrically conductive sleeve 4 adjacent the terminal block 3.

The lock switch 1 consists of a cylindrical body recessed to receive a conventional key-operated pin tumbler lock body 16. The lock switch 1 has a flange with two holes which allows mounting on the dash of the car or other suitable place with screws. The recess of lock switch 1 has two opposite axial slots which provide space for the tumbler pins when the key is withdrawn. These pins when extended into the slots prevent rotation of lock body 16.

On a square extension of lock body 16 is mounted the contactor block 2 on whose rear face is mounted, 180° apart, two two-pronged contactor springs 13. On the front face of block 2 are two lugs 2a and 2b, 180° apart which contact abutments 1a and 1b on the rear face of lock switch 1 in such a way that rotation of contactor block 2 is limited to 45° either side of vertical center line. The block 2 is coupled with the body of lock switch 1 through confining screw 2c.

The arms of each contactor spring 13 are spaced so as to span adjacent terminal points 14 set into insulated block 3.

Figure 1:
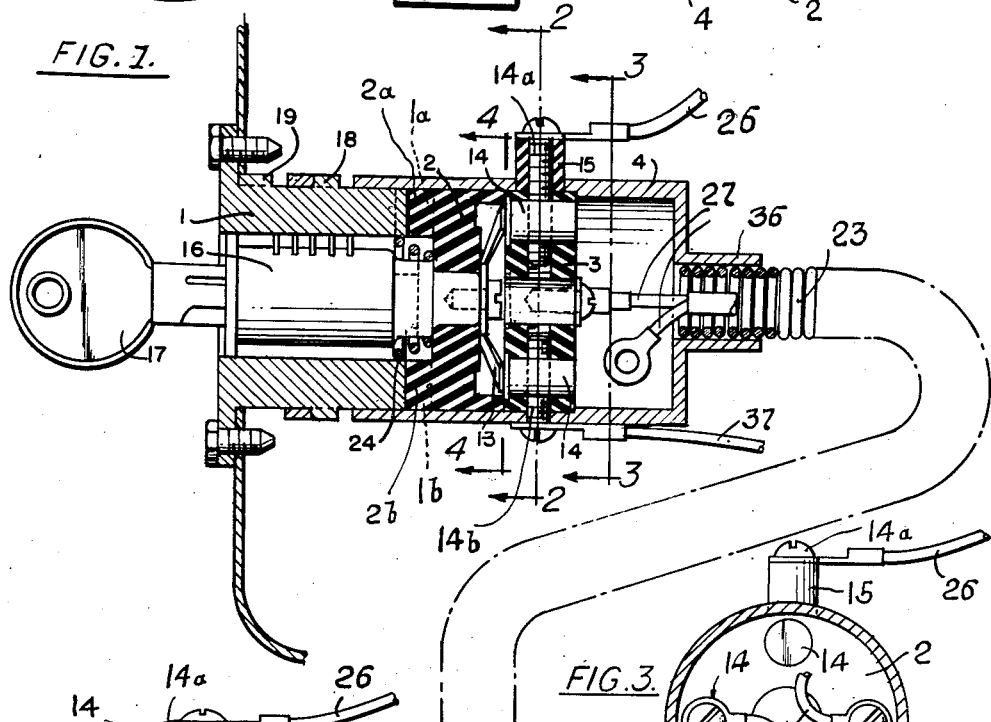
Fig. 1 is a vertical cross sectional view through the lock switch of my invention with certain parts illustrated in side elevation and showing the manner of mounting the switch on the dahsboard of a vehicle.
Figure 3:
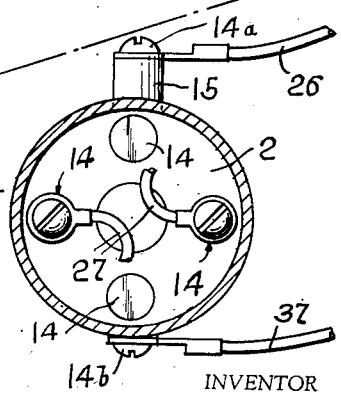
Fig. 3 is a vertical sectional view taken substantially on line 3—3 of Fig. 1.
Figure 2:
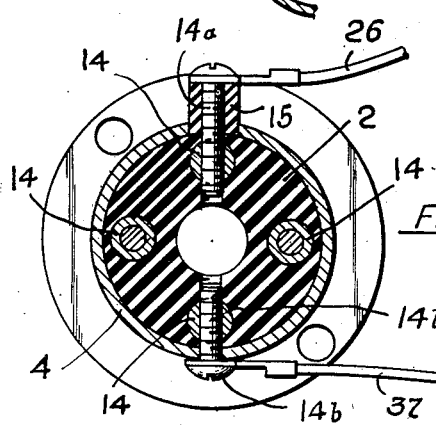
Fig. 2 is a vertical sectional view taken substantially on line 2—2 of Fig. 1.

Terminal block 3 is formed from insulation material and contains four equally spaced terminal points 14, two of which, disposed diametrically opposite each other as shown in Figs. 1, 2 and 3, have radial threaded holes for the passage of screws 14a and 14b. Screw 14a enters through insulating bushing 15 through lock cover sleeve 4 and screws into block 3 and into terminal point 14, thus furnishing an electrical contact to the battery terminal lead 26. The other screw simply grounds its terminal point to electrically conductive T as shown at 37. The alternate terminal points 14 are threaded axially and to them are fastened the two leads 27 from the electromagnet of the check valve shown in Fig. 1A.

The electrically conductive cover sleeve 4 is provided with slots of the well-known bayonet lock type which engage corresponding lugs 18 on the outer surface of body 1. In assembling sleeve 4 on body 1 the key 17 must be turned 45° to the left, when facing the lock 1 so that the lugs 2a and 2b on block 2 will directly face the recess on the back face of body 1, which is approximately 1/16 inch below the base surface. Now if sleeve 4 is pushed forward so that the lugs 18 fully enter the bayonet slots against the force of spring 24, sleeve 4 may be twisted into the locked position. If the key 17 is then brought back to the vertical position, or withdrawn, the bayonet 18 may not then be disengaged because all internal parts are then aligned to go into compression, if pressure is put on sleeve 4 to disengage it.

The electromagnetically controlled valve shown in Figs. 1A and 5 is adapted to be attached to the master brake cylinder 28 consists of a non-magnetic body or sleeve 5 with female threads in each end, with a central bore just large enough to allow the cylindrical magnet 11 to slide freely in an axial direction. This bore is surrounded by a series of axial slots 29 which allow the brake fluid to flow freely through the chamber with little restraint.

Into the body or sleeve 5 is screwed the steel header 7, the other end of which is threaded and screwed into the master cylinder 28. This header at its extreme end has a counterbored and threaded recess 7a, into which is screwed, against a gasket 30, a non-magnetic metal tube 6, the inner end of which is shaped at 6a forming an annular valve seat to receive the tapered end 11a of magnet 11.

Into the opposite end of the body or sleeve 5 is screwed a steel plug 8, one end of which has a drilled and threaded hole to receive the pipe T 25. The other end of plug 8 has a series of substantially longitudinal holes 8a drilled through the wall but so inclined that the fluid in flowing through the body will not impinge directly on the end of magnet 11. Into the end of plug 8 is set a small plug 12 of non-magnetic material, such as brass, whose end extends slightly beyond the end of plug 8 for preventing sticking of the magnet 11 to the material of steel plug 8.

The externally threaded end 8b of plug 8 extending beyond the end of body or sleeve 5 is engaged by an internally screw threaded steel heater 20 which acts as a retainer for one end of the coil form 9 of insulation material and protecting sleeve 21 and is also an element in the magnetic flux path.

Surrounding the body or sleeve 5 is coil form 9 on whose sections is wound about 100 feet of No. 22 enameled magnet wire constituting winding 31. The winding is started at the center rib 9a, and the two halves 31a and 31b wound in the same direction, as shown in the detail of part 9 in Figs. 10 and 11. The coil form 9 is slotted at 9b to permit the passage of the winding from the half shown at 31a to the half shown at 31b.

The wire is continuous, and a current flow from the battery 32 through this opposed coil 31a—31b produces two separate, opposed magnetic circuits, so that the steel end headers 7 and 20, will be magnetized by induction with the same polarity, so that if these headers are positive with one direction of current flow, the magnet 11, which has both a positive and negative pole, will be urged by a push-pull effect toward that end where the unlike poles will be most closely adjacent. Upon reversal of the current, headers 7 and 20 will reverse in polarity and magnet 11 will move to the opposite end urged by the same push-pull effect, but in reverse.

It is to be noted that provision has been deliberately made that the magnet does not actually touch either header 7 or plug 8. This is because, with actual contact, the magnet 11 has a very strong attraction for either header 7 or plug 8 it touches and it would require a very much stronger coil to break it loose than if a small air gap were maintained at the end of its travel.

The maximum travel of magnet 11 can be ¼ inch or more; but in the interest of compactness, has been kept at about ¼ inch in the present instance.

The two outside ends of the coil 31 pass up through holes 10a and 10b in the terminal block 10 and terminate under the heads of two screws 33 and 34 which pass through threaded holes in block 10 and extend into drilled, but not tapped, holes in the center rib 9a of coil form 9. This prevents the coil from moving relative to protecting sleeve 21 and terminal block 10, and thus prevents the leads 35 from pulling loose.

A two-conductor cable extends from leads 35 from the terminal block 10 to two terminal points 14 set into terminal block 3 of the switch assembly through leads 27 in Fig. 1. This cable is protected by threaded sleeve 22 into the end of which is fastened a close-wound helical spring 23, the other end of which enters the small end of sleeve 4 shown at 36 of the switch assembly, shown in Fig. 1.

Figure 6:
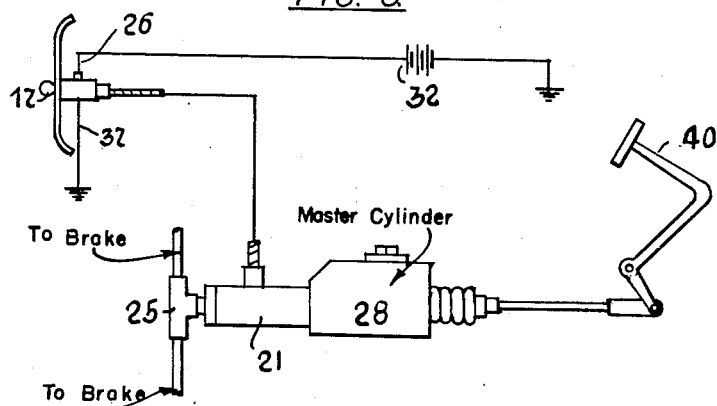
Fig. 6 is a schematic view showing the arrangement of the electric control switch and the electromagnetic control valve in the brake lock system of my invention.

In Fig. 6 I have shown the arrangement for the valve system of my invention wherein the brake pedal 40 normally controls the master cylinder 28 which controls the supply of brake fluid to the distribution pipes to T 25 leading to the several brake drums. The electromagnetic valve system of my invention is controlled from the switch operated key 17 to supply current from source 32 in proper polarity to the electromagnetic system constituted by opposed coils 31a—31b on the coil support 9. The electromagnetic valve is controlled independently of the brake pedal 40.

Figure 7:
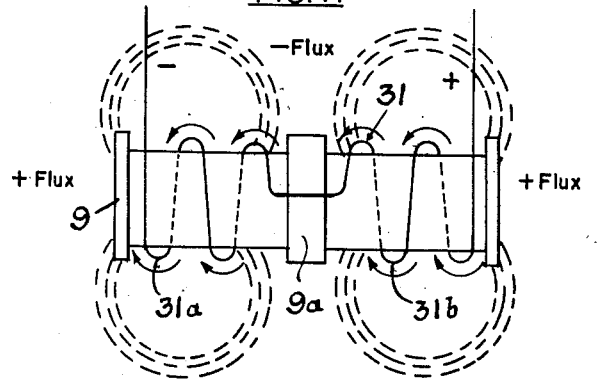
Fig. 7 is a theoretical view illustrating the distribution of magnetic flux in the electromagnetic control system of my invention.

As shown in Fig. 7 the opposed windings 31a and 31b consist of an electrical conductor which, in one form of my device, which has been successfully operated, consists of about 100 feet of No. 22 wire doubled back from the center so that there are two lengths approximately 50 feet long with a 180 degree loop at the center. If this loop is inserted in the horizontal slot in the center flange 9a of the coil form 9 and the coil form rotated counterclockwise as viewed from the right in Fig. 7, when fully wound in layers, the two ends are soldered to terminals in block 10. This winding 9 is shown in Fig. 1A.

By applying the well-known hand rule the direction of magnetic flux in the solenoid is readily determined. This rule states that if the right hand grasps the solenoid so that the fingers are pointing in the direction of current flow, the thumb will point in the direction of the flux path, or the north pole.

In Fig. 7 if the current is considered to flow down the paper from the plus sign across the front of the coil and up at the back of the coil, and the hand-rule is applied, then the thumb will point to the right or north pole which is marked plus flux. It will be observed that the wire which has formed a left hand helix, as viewed from the right, on the right side of the coil form, now at the center, forms a right hand helix on the left side of the coil form. The current, however, flows continuously from the plus side to the minus side. But applying the hand rule to the left section the thumb will point to the left, or north pole. There is then a north pole on the extreme right and a north pole on the extreme left. No single magnetic circuit may have two north poles or two south poles, but only a north and a south pole. Since flux lines will not cross one another there must be two separate and distinct magnetic fields. But the flux lines at the center, being alike, will distort the paths of these lines widely. If the current of the coil is now reversed the polarity will be S–N–N–S.

The steel headers 7 and 20 are magnetized by induction by the electromagnetic flux and both are either plus or minus at the same time, depending on the current flow in the coil 9.

Since the permanent magnet 11 which may be formed from powerful magnet material, such as "Alnico," has opposite poles of unchanging polarity, and these lie in close proximity to the end header 7 or plug 8, there is a push-pull effect, unlike poles attracting each other and like poles repelling each other, reversal occurring when the current in the coil 9 is reversed.

After pressure has been built up in the master cylinder 28 by application of pressure against foot pedal 40 with the control switch of Figs. 1–4 and 12 and 13 in the position shown in Fig. 9, the pressure is distributed through tube 6, passages 29 and ports 8a to the T 25 where it distributes to the several individual brake cylinders. During this period magnet 11 is shifted to the left with its south pole resting against plug 12 and maintained by the magnetism of plug 8 which has been just previously energized by the momentary closing of the control switch 13 in the position shown in Fig. 9. When it is desired to lock the system in this condition the control switch is reversed by momentary movement to the position shown in Fig. 8 whereupon header 7 becomes south and attracts the north pole end of magnet 11 while the south pole established at plug 8 repels the south pole of magnet 11 causing the right hand end of magnet 11 to move the tapered end 11a thereof against seat 6a of tube 6.

When the brake pedal 40 is depressed the piston in the master cylinder 28 builds up a pressure throughout the hydraulic system of many hundreds of p. s. i. This pressure physically extends the walls of the containing tubes, brake cylinders, etc., so that any given small section of tubing will have a greater diameter than when free of pressure. If this small section has not been stressed beyond the elastic limit, it will return to its nominal diameter when the source of the pressure is removed. This elasticity is the source of the continued braking pressure when the fluid column has been sealed off by the entry of the end 11a of magnet 11 into the end 6a of tube 6. But, the magnet does not seal off the further application of pressure from the master cylinder; it merely prevents the return of fluid to the master cylinder when the piston in the master cylinder has been released, and so prevents the decay of the pressure in the brake lines which exists by virtue of the elasticity of the system.

To release this pressure requires no release valve, but does require that the piston in the master cylinder 28 be depressed to develop a pressure equal to that trapped in the brake lines.

When the end 11a of magnet 11 is once seated in the end 6a of tube 6, with the brakes energized, and then the source of pressure (the piston in the master cylinder 28) released, the force holding magnet 11 against its seat is many hundred times greater than the power of the electromagnet to unseat it. Magnet 11 may readily be urged forward and reverse if the pressure on each side of the seat is equal, and this remains true if the fluid column is at atmospheric pressure or at 1000 p. s. i.

Practically, if the brakes are locked, and they are to be released, pressure is established in the master cylinder 28, equal to that already trapped, and at the same time current is established which will energize the winding 31 to move magnet 11 to the left. The magnet will stick to the left plug 8 and will not be dislodged by the oil-flow around it in the normal operation of the brakes. In the other hand, if magnet 11 is urged to the right, or the position for sealing the fluid against return to the master cylinder, it will tend to stick there, only being displaced sufficiently to allow fluid to flow from the master cylinder 28 to the brakes.

Upon removal of pressure from the master cylinder 28, the end 11a of magnet 11 will remain seated in the end 6a of tube 6 with a force equal to the trapped pressure in p. s. i. times the area of the seat. This may be as high as 100 pounds. Magnet 11 may then be brought to the left only after again bringing the pressure in the master cylinder up to that existing in the brake lines.

If the right hand end of magnet 11 is north and the left hand south, excitation of the windings 31a and 31b, so that the steel end header 7 and the plug 8 are both south, effects a movement of the magnet 11 to the right, sealing off the flow of fluid. If, however, the steel header 7 and plug 8 are magnetized as north poles, magnet 11 will be forced to the left, thereby opening the flow path for the hydraulic fluid. The virtual poles established in the center of the solenoid are so displaced from the polarized ends of the magnet as to assist in the movement of the magnet by the push-pull effect hereinbefore referred to.

In Fig. 8 I have illustrated the polarity condition for the electromagnetic winding for one limiting position of the control switch, while in Fig. 9, I have indicated the polarity conditions of the electromagnetic winding for the opposite limiting position of the control switch, whereby the lineal displacement of the magnet 11 is effected for controlling the flow to the several individual brake actuating cylinders. Thus, movement of magnet 11 in either direction axially, is secured over a two-wire circuit for controlling the flow of fluid to the several brake actuating cylinders and for locking the fluid against discharge from the cylinders, thus locking the brakes over an extended time period.

The system of my invention has proven highly effective and while I have described my invention in one of

What I claim as new and desire to secure by Letters Patent of the United States is as follows:

1. An electromagnetic fluid valve comprising a cylindrical sleeve having a header of magnetic material at each end thereof forming a closed cylindrical chamber, a non-magnetic tubular member extending through one of said headers and forming a fluid inlet means, a fluid discharge means formed in a plug mounted in the other of said headers, a cylindrical permanently polarized magnet slidable within said sleeve and movable between an annular valve seat in the end of said non-magnetic tubular member and the said plug for closing or opening said fluid inlet means and an electromagnetic actuating winding disposed on said sleeve and between said headers, and means for electrically exciting said actuating winding for reversing the polarity of said headers and effecting a displacement of said magnet for selectively closing or opening said fluid inlet means.

2. An electromagnetic fluid valve as set forth in claim 1 in which said sleeve is longitudinally fluted around the interior surface thereof for a distance substantially less than the length of said cylindrical magnet to provide paths for the flow of fluid around said magnet between said fluid inlet means and said fluid discharge means when said magnet is displaced from said annular seat on said non-magnetic tubular member in the direction of the fluid discharge means.

3. An electromagnetic operating device as set forth in claim 1 in which said non-magnetic tubular member terminating in an annular valve seat, extends within one end of said electromagnetic actuating winding axially of said cylindrical magnet and wherein said fluid discharge means extends into the other end of said electromagnetic actuating winding on an axis coincidental with the axis of said magnet and said fluid discharge means.

4. An electromagnetic fluid valve as set forth in claim 1 in which said cylindrical sleeve is formed of nonmagnetic material and is internally screw threaded at each end thereof and in which the header adjacent the fluid inlet means has an externally screw threaded portion engaging the internal screw threads on the adjacent end of said sleeve and wherein said plug containing the fluid discharge means is externally screw threaded and engages the internal screw threads on the other end of said cylindrical sleeve.

5. An electromagnetic fluid valve as set forth in claim 1 in which said cylindrical sleeve is formed of nonmagnetic material and is internally screw threaded at each end thereof and in which the header adjacent the fluid inlet means has an externally screw threaded portion engaging the internal screw threads on the adjacent end of said sleeve and wherein said plug containing the fluid discharge means is externally screw threaded and engages the internal screw threads on the other end of said cylindrical sleeve, and in which the header adjacent the last mentioned end of said sleeve is internally screw threaded and engages a portion of the length of the external screw thread on said plug adjacent the last mentioned end of said sleeve.

6. An electromagnetic fluid valve as set forth in claim 1 in which said plug contains a multiplicity of ports inclined outwardly from the central axis of the plug to positions adjacent the interior surface of said sleeve and out of direct alignment with the longitudinal axis of the path of movement of said cylindrical magnet.

7. An electromagnetic fluid valve as set forth in claim 1 in which said plug contains a central recess in alignment with the axis thereof, and wherein a plug of non-magnetic material is maintained in the central reccess to form an abutment for the end of said cylindrical magnet for preventing magnetic sticking thereof.

8. An electromagnetic fluid valve as set forth in claim 1 in which said plug contains a central recess in alignment with the axis thereof, and wherein a plug of non-magnetic material is maintained in the central recess to form an abutment for the end of said cylindrical magnet for preventing magnetic sticking thereof, and a plurality of ports in said plug in positions located around the central recess in the plug, the ports being inclined outwardly from the central axis of the plug to positions adjacent the interior surface of said sleeve and out of direct alignment with the longitudinal axis of the path of movement of the cylindrical magnet.

References Cited in the file of this patent

UNITED STATES PATENTS

| | | |
|---|---|---|
| 2,187,789 | Lanz | Jan. 23, 1940 |
| 2,289,563 | Wood et al. | July 14, 1942 |
| 2,366,412 | Lambert | Jan. 2, 1945 |
| 2,435,425 | Cunningham | Feb. 3, 1948 |
| 2,446,353 | Wittmann | Aug. 3, 1948 |
| 2,502,118 | Ashton et al. | Mar. 28, 1950 |
| 2,579,723 | Best | Dec. 25, 1951 |
| 2,588,793 | Barry | Mar. 11, 1952 |
| 2,638,118 | Chandler | May 12, 1953 |
| 2,650,958 | Jacobi | Sept. 1, 1953 |

FOREIGN PATENTS

| | | |
|---|---|---|
| 398,331 | France | Mar. 20, 1909 |
| 208,703 | Great Britain | July 10, 1924 |